Jan. 17, 1928. 1,656,472
F. H. CHRISTOFFERSON
BRAKE MECHANISM FOR MOTOR CYCLES AND THE LIKE
Filed Feb. 3, 1925
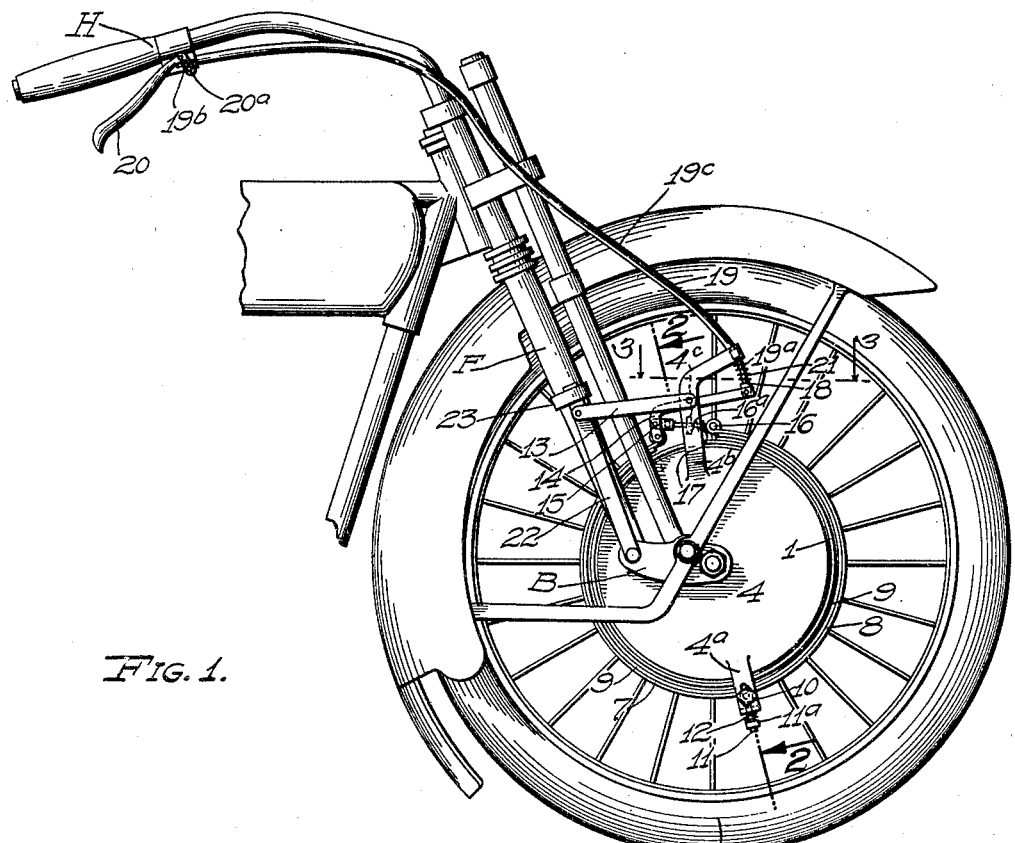
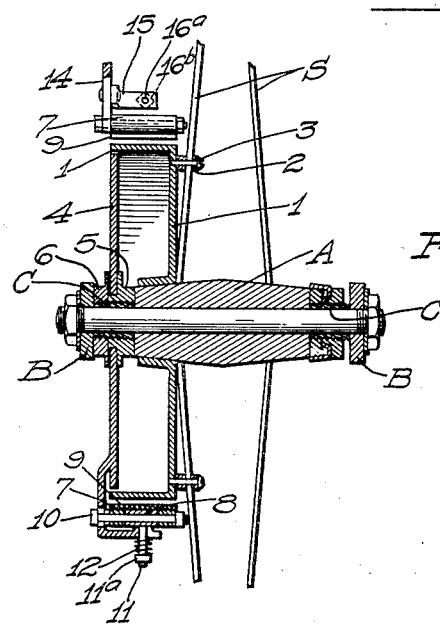
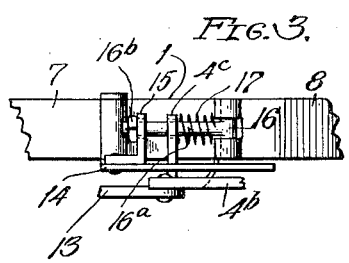
Inventor
FRANKLIN H. CHRISTOFFERSON.
By A. B. Bowman
Attorney Patented Jan. 17, 1928.

1,656,472

UNITED STATES PATENT OFFICE.

FRANKLIN H. CHRISTOFFERSON, OF SAN YSIDRO, CALIFORNIA.

BRAKE MECHANISM FOR MOTOR CYCLES AND THE LIKE.

Application filed February 3, 1925. Serial No. 6,556.

My invention relates to a brake mechanism, particularly adapted for the front wheels of motorcycles or similar vehicles, and the objects of my invention are: first, to provide an efficient brake mechanism of this class for motorcycles and like vehicles, whereby the braking of the front wheels thereof can be readily effected as desired from the handle bars of the motorcycle or other vehicle; second, to provide a brake mechanism for the front wheel of a motorcycle in which the front wheel is revolubly mounted on a pivoted and vertically yieldable support; third, to provide a brake mechanism of this class in which the brakeband or other braking member positioning support is held in a non-rotatable position relatively to the frame of the motorcycle by a pivotal connection with the frame; fourth, to provide a novel means for supporting the braking mechanism relatively to the frame and the vertically yieldable wheel of the vehicle; fifth, to provide as a whole a novelly constructed braking mechanism for motorcycles and the like, and sixth, to provide a mechanism of this class which is simple and economical of construction, durable, applicable to various types of motorcycles and other vehicles, and a mechanism of this class which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary view of the forward end of a motorcycle, showing my brake mechanism in connection with the front wheel thereof, and Fig. 2 is a sectional view thereof, taken through 2—2 of Fig. 1.

Fig. 3 is an enlarged fragmentary view taken on line 3—3 of Fig. 1.

Like characters of reference refer to similar parts and portions throughout the views of the drawings.

The brake-drum 1, clamp member 2, bolts 3, brake-band supports 4, nuts 5 and 6, brake-band members 7 and 8, brake-band lining 9, bolt 10, stud 11, spring 12, link 13, bell crank lever 14, shackle 15, pivot bolt 16, spring 17, shackle 18, Bowden cable 19, brake actuating lever 20, and the compression spring 21, constitute the principal parts and portions of my brake mechanism.

In motorcycle construction the front wheel is now usually revolubly mounted on a pivotal support, as indicated by B in Fig. 1, which is pivotally mounted on the frame F of the motorcycle and is adapted to be shifted about its pivotal axis to take up shocks of the wheel by actuating a spring mechanism or other shock absorber.

My present invention relates particularly to a vertically yieldable motorcycle front wheel as disclosed.

The brake-drum 1 of my brake mechanism is preferably supported with its hub portion on the hub A of the wheel W and is secured by means of a plurality of clamp members 2 and bolts 3 to the spokes of the wheel. At the one end of the drum 1 is positioned an actuating brake member support or brakeband support 4, preferably in the form of a disc, which is positioned centrally within the open end of the drum 1 by means of a pair of nuts 5 and 6 secured to the axle housing C of the vehicle. The support 4 is provided at its lower end with a downwardly and laterally extending lug $4^a$ on which are supported the pivotal ends of the actuating brake member or brake-band members 7 and 8, by means of a bolt 10. These brake-band members are preferably lined with a suitable lining 9, as in conventional brake construction. The pivotal portion of one of the brake-band members is provided with a downwardly extending stud 11 which extends through a hole or slot in the laterally extended portion of the lug $4^a$ of the support 4. The free end of this stud is provided with a nut $11^a$. Intermediate the lug $4^a$ and the nut $11^a$ is positioned a compression spring 12 which is adapted to force the pivotal portions of the brake-band members 7 and 8 from the brake-drum 1.

Diametrically opposed to the lug $4^a$ on the support 4 is another lug $4^b$ which extends radially therefrom and is then turned forwardly. This lug $4^b$ is pivotally connected, by means of a link 13, with the fork portion of the frame F. To prevent weakening of the frame F, in order to pivotally connect the one end of the link 13 thereto, I have provided an additional strap 22 which extends from the pivotal connection of the frame F with the pivotal support B upwardly and is secured to the one fork portion of the frame by means of a strap 23 extending around the same.

To the free end of the brake-band member 7 is pivotally connected the end of the short arm of a bellcrank lever 14. Intermediate the ends of the short arm of the bellcrank lever 14 is pivotally connected a shackle 15. At the free end of the other brake-band member 8 is pivotally mounted the head portion of a substantially T-shaped bolt 16, the shank portion 16$^a$ of said bolt extending into and being reciprocally mounted at the free end of the shackle 15. Said shank portion also extends through and is freely reciprocable in a lug 4$^c$ positioned between the free ends of the brake-band members and extending inwardly from the inner side and intermediate the ends of the arm or lug 4$^b$. Said shank portion of the bolt 16 is provided at the end extending through said shackle with a nut 16$^b$. Around the shank portion of the bolt 16 is provided a compression spring 17 which is positioned between the free end of the brake-band member 8 and the lug 4$^c$, said spring being adapted to keep the free ends of the brake-band members 7 and 8 separated.

The free end of the long arm of the bellcrank lever 14 is provided with a shackle 18 which is connected to the one end of the rod or wire 19$^a$ of the Bowden cable 19. Said rod or wire 19$^a$ extends through a flexible tube 19$^c$ which is secured at its one end to the forwardly bent portion of the lug 4$^b$ and at its other end to the handle-bar H of the motorcycle. The end of the wire 19$^a$ opposite the one secured to the bellcrank lever 14 is provided with a lug 19$^b$ which is reciprocally mounted in a bracket secured to the handle-bar H. To the one handle-bar of the motorcycle is pivotally mounted a substantially bellcrank-shaped brake actuating lever 20, which is provided with a slotted portion 20$^a$ adapted to straddle the lug 19$^b$ of the Bowden cable and draw the wire or rod 19$^a$ thereof through the tube. Shifting the lever 20 toward the handle-bar H of the motorcycle compresses a compression spring 21 positioned around the rod 19$^a$ of the Bowden cable between the forward end of the lug 4$^b$ and the free end of the bellcrank lever 14, and shifts said bellcrank lever counter-clockwise and draws the free ends of the brake-band members toward each other.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a mechanism of the class described, the combination with a vertically yieldable front wheel of a motorcycle or similar vehicle, of a revoluble brake member secured to said wheel, an actuating brake member support vertically shiftable with said wheel and pivotally connected to the frame of the motorcycle or similar vehicle, an actuating brake member shiftably supported by said support, and means for shifting said actuating brake member.

2. In a mechanism of the class described, the combination with a vertically yieldable front wheel of a motorcycle or similar vehicle, of a brake-drum secured to said wheel, an actuating brake member support vertically shiftable with said wheel and non-rotatably supported relative and separately and yieldably connected to said frame, an actuating brake member shiftably mounted on said support contiguous to said brake-drum, and lever means connected with said actuating brake member for shifting the same towards said brake-drum.

3. In a mechanism of the class described, the combination with a vertically yieldable front wheel of a motorcycle or similar vehicle, of a brake-drum secured to said wheel, an actuating brake member support vertically shiftable with said wheel and non-rotatably supported relative and separately and yieldably connected to said frame, brake-band members pivotally mounted at their one ends on said support and extending partially around said drum, and a bellcrank lever means for contracting the free ends of said brake-band members.

4. In a mechanism of the class described, the combination with a vertically yieldable front wheel of a motorcycle or similar vehicle, of a brake-drum secured to said wheel, an actuating brake member support vertically shiftable with said wheel and non-rotatably supported relative and separately and yieldably connected to said frame, brake-band members pivotally mounted at their one ends on said support and extending partially around said drum, a bellcrank member pivotally connected at the free end of one of its arms to the free end of one of said brake-band members, a means pivotally connecting the free end of the other brake-band member to said bellcrank member contiguous to its connection with said first mentioned brake-band member, and a means for shifting the other arm of said bellcrank member.

5. In a mechanism of the class described, the combination with a vertically yieldable front wheel of a motorcycle or similar vehicle, of a brake-drum secured to said wheel, an actuating brake member support vertically shiftable with said wheel and non-rotatably supported relative to said frame, brake-band members pivotally mounted at their one ends on said support and extending partially around said drum, a bellcrank member pivotally connected at the free end of one of its arms to the free end of one of said brake-band members, a shackle pivotally connected at its one end to said bellcrank member contiguous to its pivotal connection with said brake-band member, a bolt pivotally mounted at its one end on the free end of said other brake-band member and having its shank portion reciprocally supported in said shackle member, and a compression spring extending around the shank portion of said bolt.

6. In a mechanism of the class described, the combination with a vertically yieldable front wheel of a motorcycle or similar vehicle, of a brake-drum secured to said wheel, an actuating brake member support vertically shiftable with said wheel and non-rotatably supported relative to said frame, brake-band members pivotally mounted at their one ends on said support and extending partially around said drum, a bellcrank member pivotally connected at the free end of one of its arms to the free end of one of said brake-band members, a shackle pivotally connected at its one end to said bellcrank member contiguous to its pivotal connection with said brake-band member, a bolt pivotally mounted at its one end on the free end of said other brake-band member and having its shank portion reciprocally supported in said shackle member, a compression spring extending around the shank portion of said bolt, and a Bowden cable means, the tube portion thereof being secured relatively to said support and the handle-bar of said motorcycle or similar vehicle and the rod thereof secured to the opposite arm of said bellcrank lever extending through said tube to said handle-bar.

7. In a brake mechanism of the character described, the combination with a frame and a revoluble member mounted thereon, of a brake-drum secured thereto, a brake-band member support secured relative to said drum and provided with extended lugs, a pair of brake-band members pivotally mounted at their one ends on one of said lugs, another of said lugs being pivotally connected with said frame, a bellcrank lever pivotally connected at the end of its one arm to the free end of one of said brake-band members and pivotally connected intermediate the ends of said one arm with the free end of said other brake-band member, and means for actuating said bellcrank lever.

8. In a mechanism of the class described, the combination with a motorcycle having a vertically yieldable front wheel, of a revoluble brake member nonrotatably secured relative to said wheel, an actuating brake member support vertically shiftable with said wheel and pivotally connected to the frame of the motorcycle, an actuating brake member mounted on said support, and means for shifting said actuating brake member.

9. In a mechanism of the class described, the combination with a motorcycle having a vertically yieldable front wheel, of a revoluble brake member nonrotatably secured relative to said wheel, an actuating brake member support vertically shiftable with said wheel and pivotally connected to the frame of the motorcycle, a brake-band supported at one end by said support, and means connected with the opposite end of said band for actuating the same.

10. In a mechanism of the class described, the combination with a motorcycle having a vertically yieldable front wheel, of a revoluble brake member nonrotatably secured relative to said wheel, a brake-band support vertically shiftable with said wheel and pivotally connected to the frame of the motorcycle, a brake-band supported at one end by said support, a lever pivoted intermediate its ends and pivotally connected at one end to the opposite end of said brake-band, and means connected to the opposite end of said lever for shifting said brake-band relative to said revoluble brake member.

In testimony whereof, I have hereunto set my hand at San Diego, California, this 26th day of January, 1925.

FRANKLIN H. CHRISTOFFERSON.